(12) United States Patent
Ohba et al.

(10) Patent No.: US 8,271,981 B2
(45) Date of Patent: Sep. 18, 2012

(54) DETECTING AN EXTRAORDINARY BEHAVIOR

(75) Inventors: Nobuyuki Ohba, Sendai (JP);
Yoshitami Sakaguchi, Hadano (JP);
Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/937,821

(22) Filed: Nov. 9, 2007

(65) Prior Publication Data

US 2008/0141249 A1    Jun. 12, 2008

(30) Foreign Application Priority Data

Dec. 12, 2006    (JP) ................................ 2006-334863

(51) Int. Cl.
*G06F 9/46* (2006.01)
*G06F 11/00* (2006.01)

(52) U.S. Cl. ........................ 718/100; 718/104; 714/47.2
(58) Field of Classification Search ........................ None
See application file for complete search history.

(56) References Cited

U.S. PATENT DOCUMENTS

| | | | |
|---|---|---|---|
| 6,332,212 B1 | 12/2001 | Organ et al. | |
| 7,954,090 B1 * | 5/2011 | Qureshi et al. | ................ 717/127 |
| 2003/0079160 A1 * | 4/2003 | McGee et al. | .................. 714/39 |
| 2003/0110007 A1 | 6/2003 | McGee et al. | |
| 2003/0139905 A1 | 7/2003 | Helsper et al. | |
| 2004/0111708 A1 | 6/2004 | Calder et al. | |

FOREIGN PATENT DOCUMENTS

| | | |
|---|---|---|
| JP | 03-210643 | 9/1991 |
| JP | 04-068451 | 3/1992 |
| JP | 2001-142746 | 5/2001 |
| JP | 2002-342182 | 11/2002 |
| JP | 2005-173853 | 6/2005 |
| JP | 2007-191740 | 8/2007 |

OTHER PUBLICATIONS

International Search Report, dated Aug. 10, 2010, Application No. PCT/JP2007/073972, International Business Machines Corporation.
Marutama, Naoya, "Daikibo Bunsan System ni Okeru Kosho no Kaiseki," IEICE Technical Report, The Institute of Electronics Information and Communication Engineers, Jul. 25, 2006, vol. 106, No. 198, Section 4.2.
International Search Report, PCT/JP2007/073972, International Business Machines Corporation.

* cited by examiner

*Primary Examiner* — Kenneth Tang
(74) *Attorney, Agent, or Firm* — Yudell Isidore Ng Russell, PLLC

(57) ABSTRACT

An apparatus detects detecting when an extraordinary behavior is performed when a monitoring task is executed on an information processing apparatus. The detecting apparatus includes: an obtaining section for obtaining a measurement data including an executing timing and an execution time for each occasion of execution when the monitoring task is executed for a number of times on the information processing apparatus; a distance calculating section for calculating a distance between a measured point corresponding to each measurement data in a multi-dimensional space on which an executing timing and an execution time are allocated to different coordinates and another measured point placed in a predetermined range; and a determining section for determining whether an extraordinary behavior is performed when the monitoring task corresponding to the measurement data is executed based on the distance obtained for the measured point corresponding to the measurement data.

13 Claims, 10 Drawing Sheets

[Figure 1]
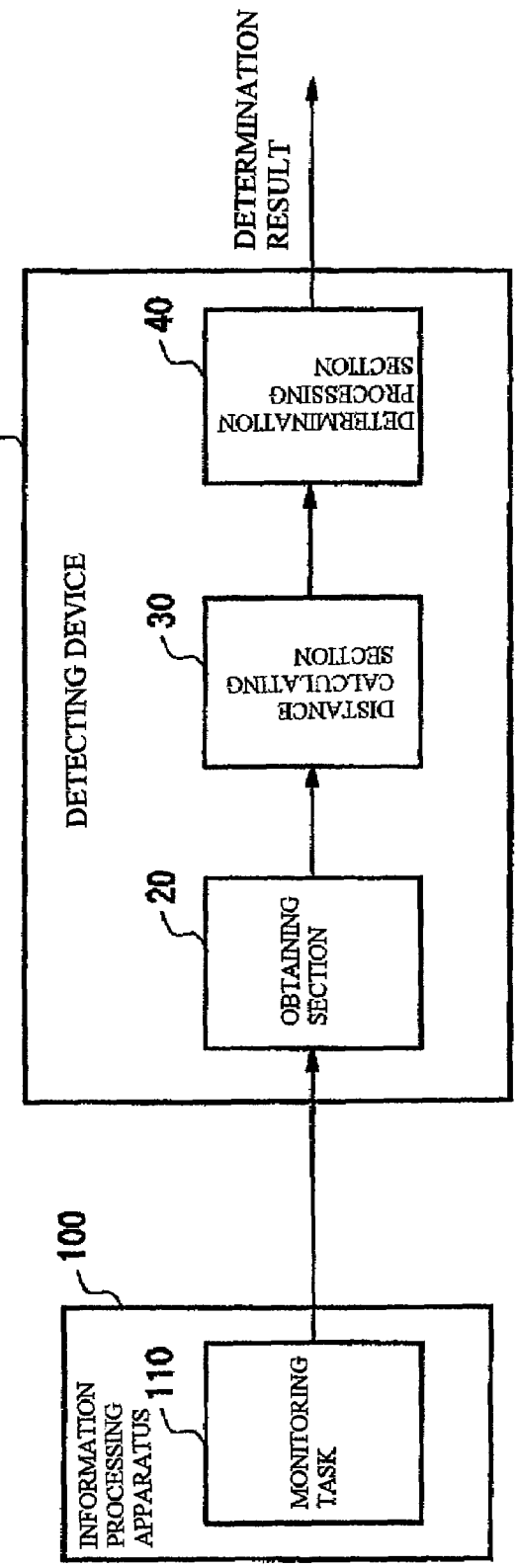

[Figure 2]
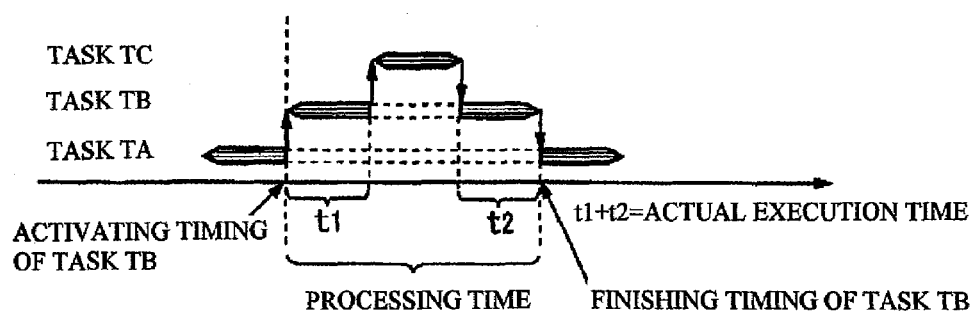

[Figure 3]
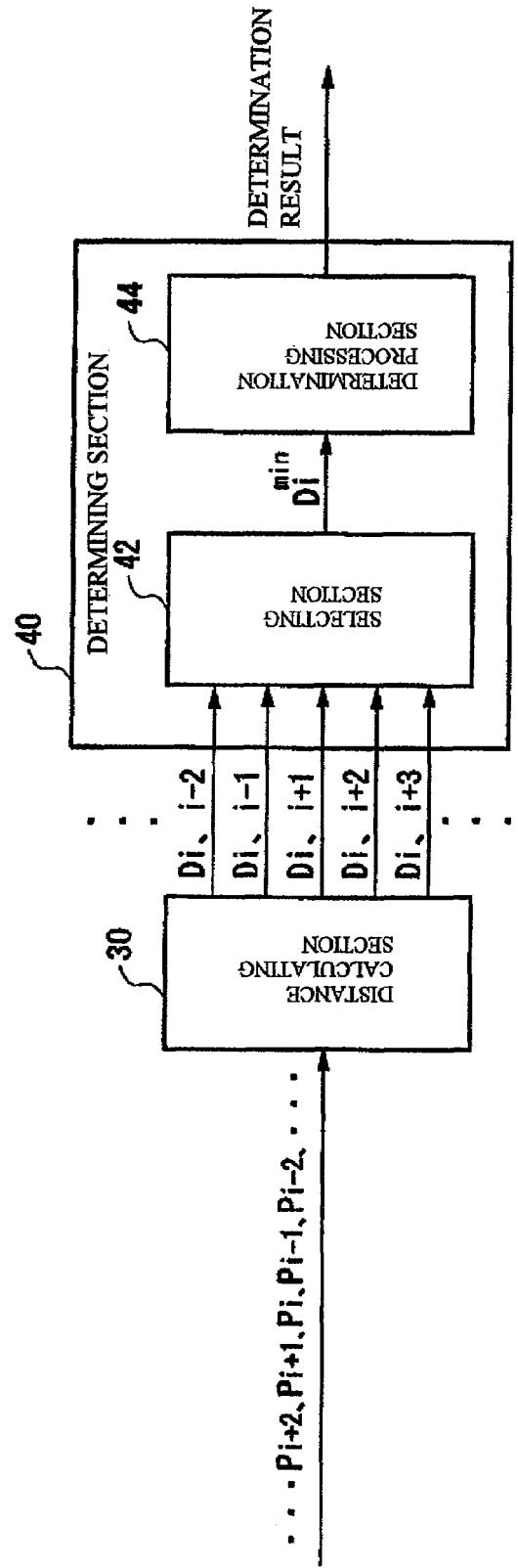

[Figure 4]
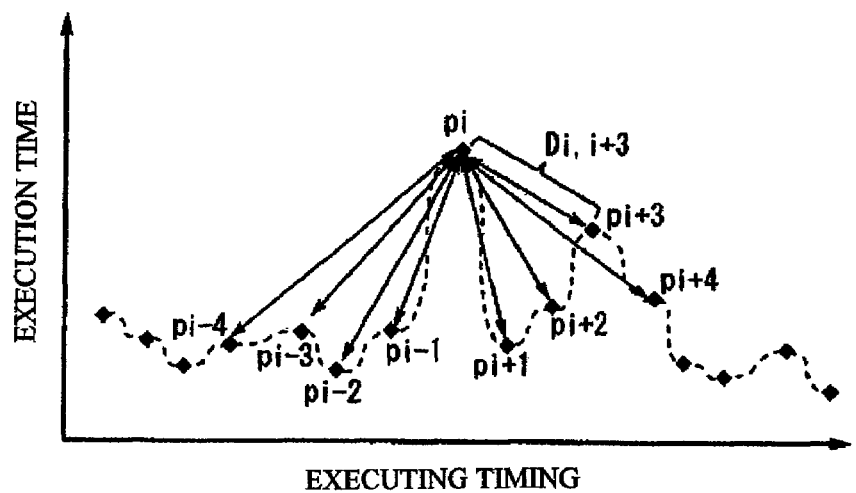
[Figure 5]
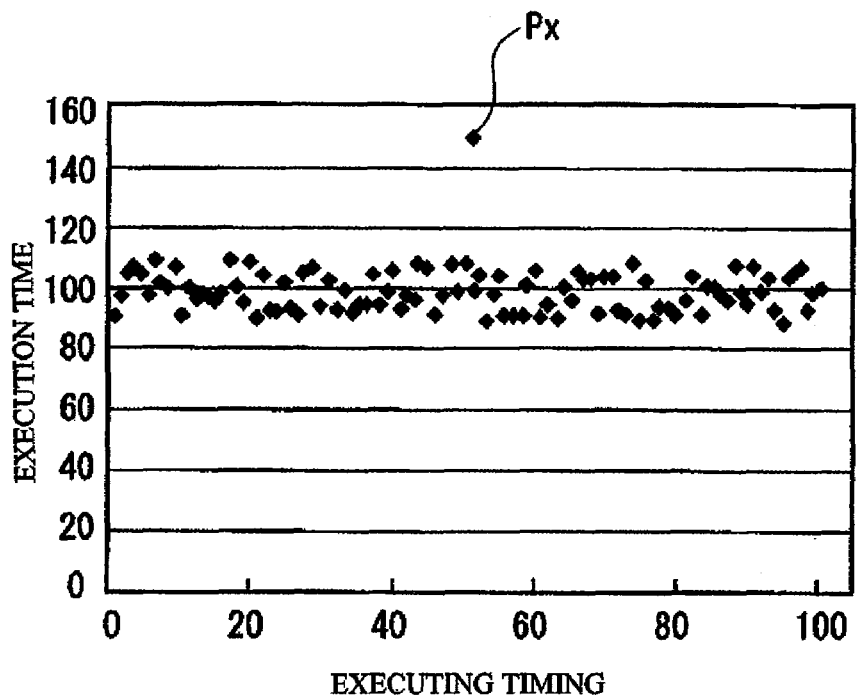

[Figure 6]
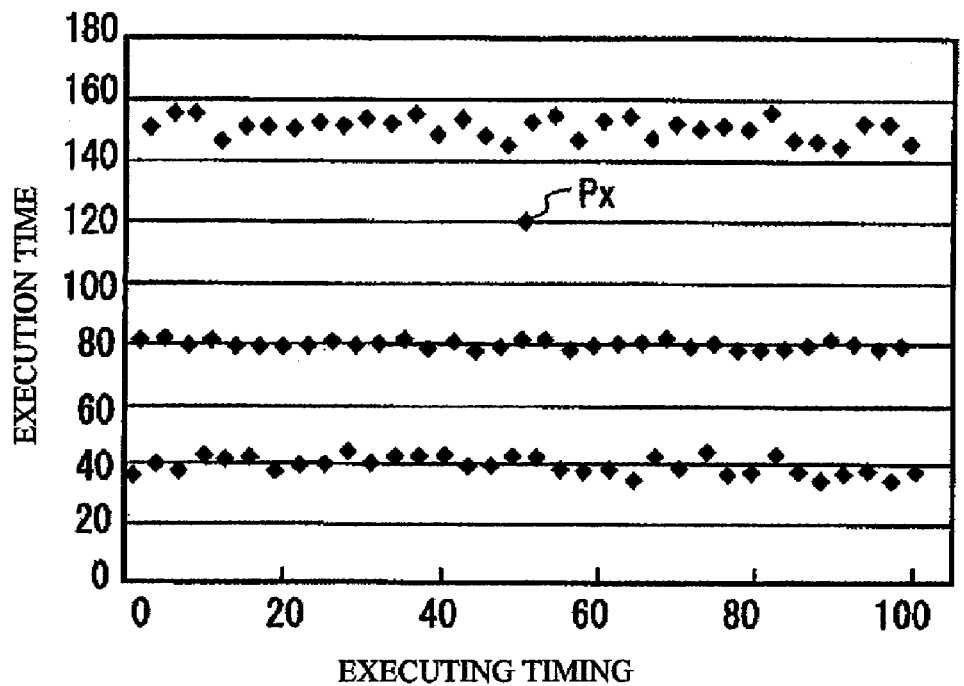
[Figure 7]
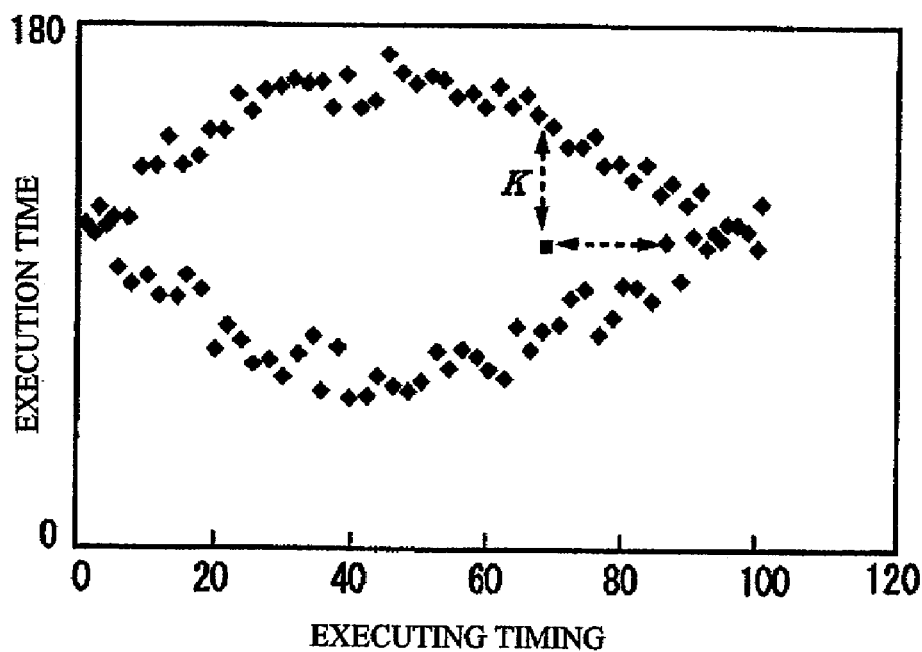

[Figure 8]
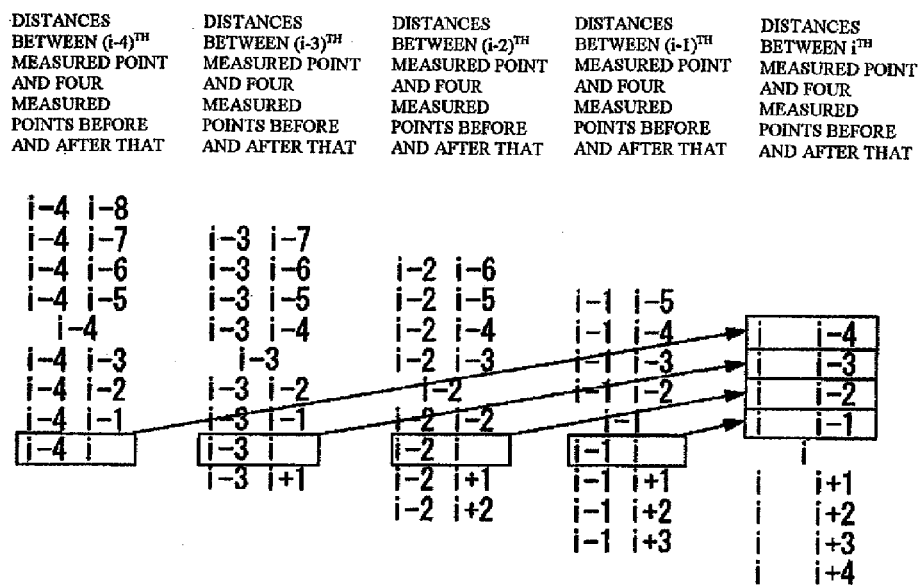

[Figure 9]
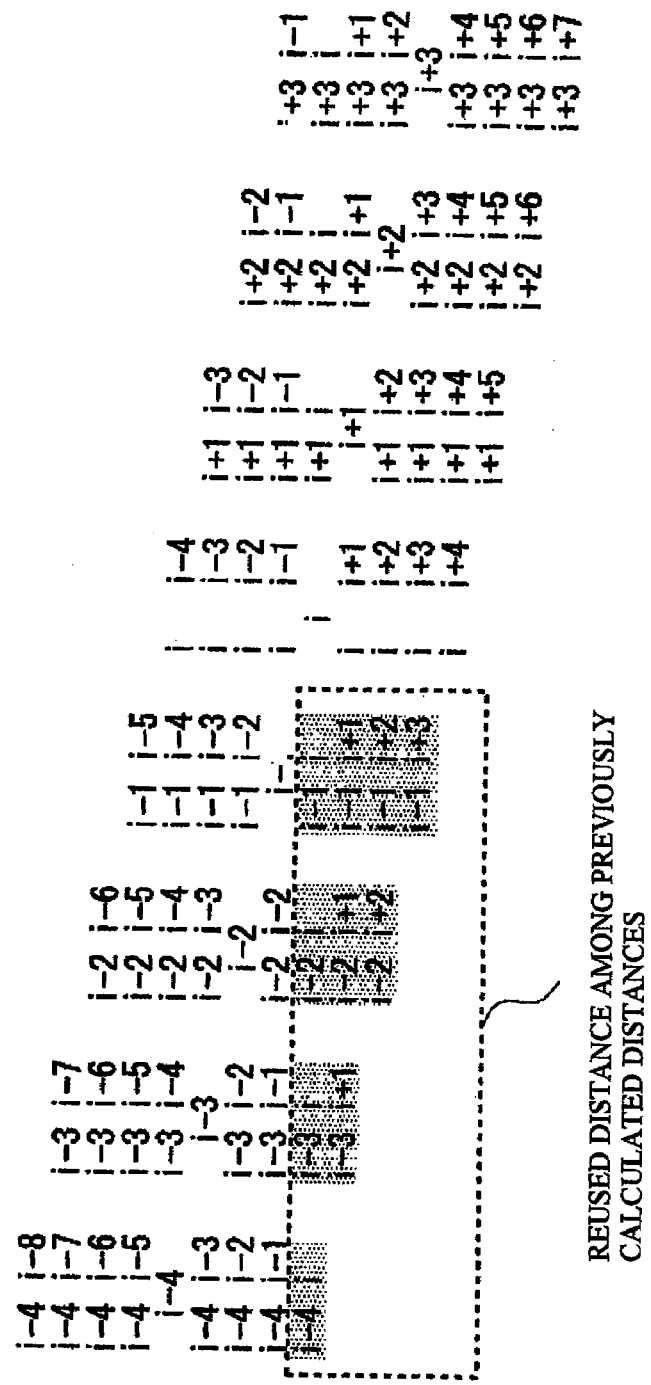

[Figure 10]
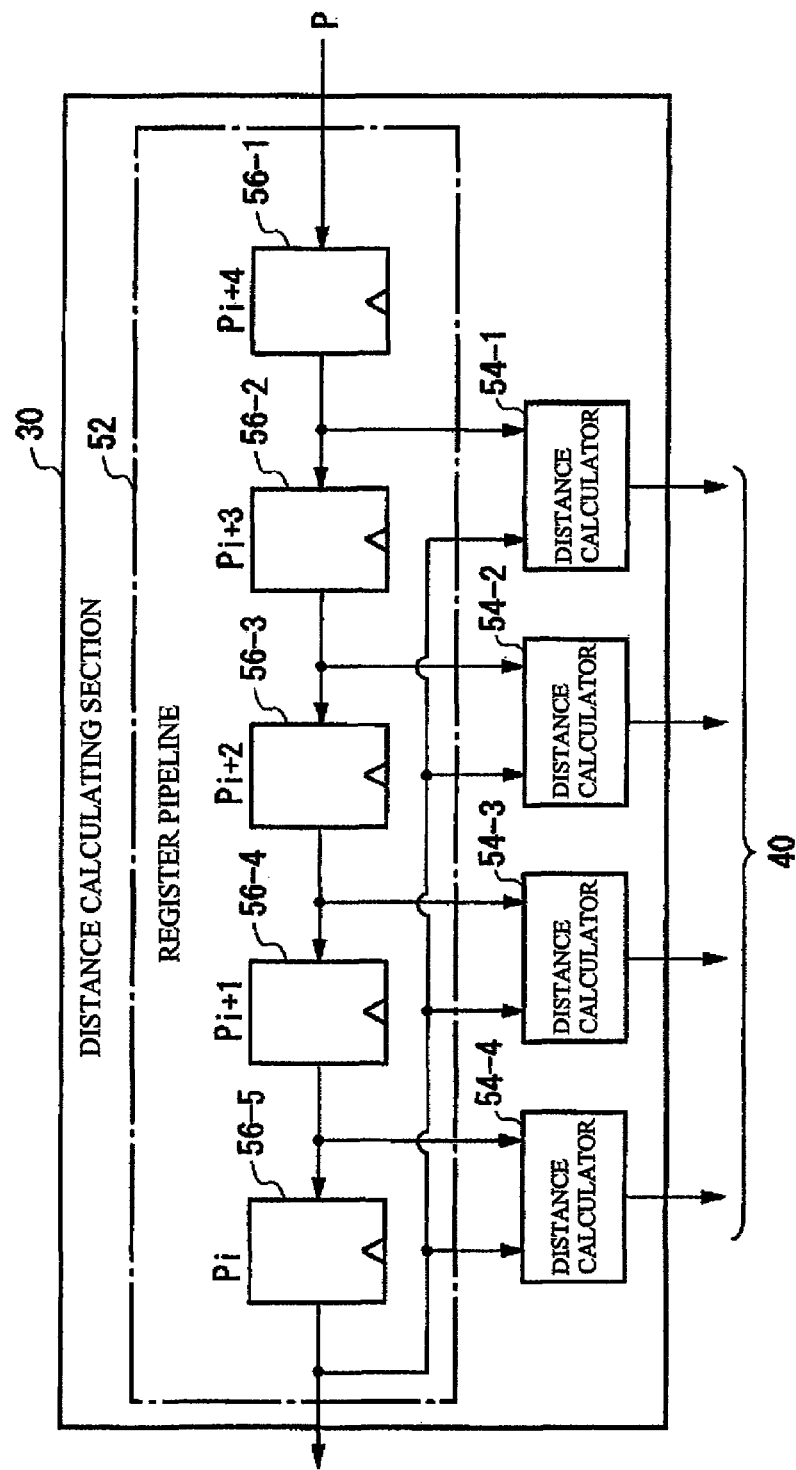

[Figure 11]
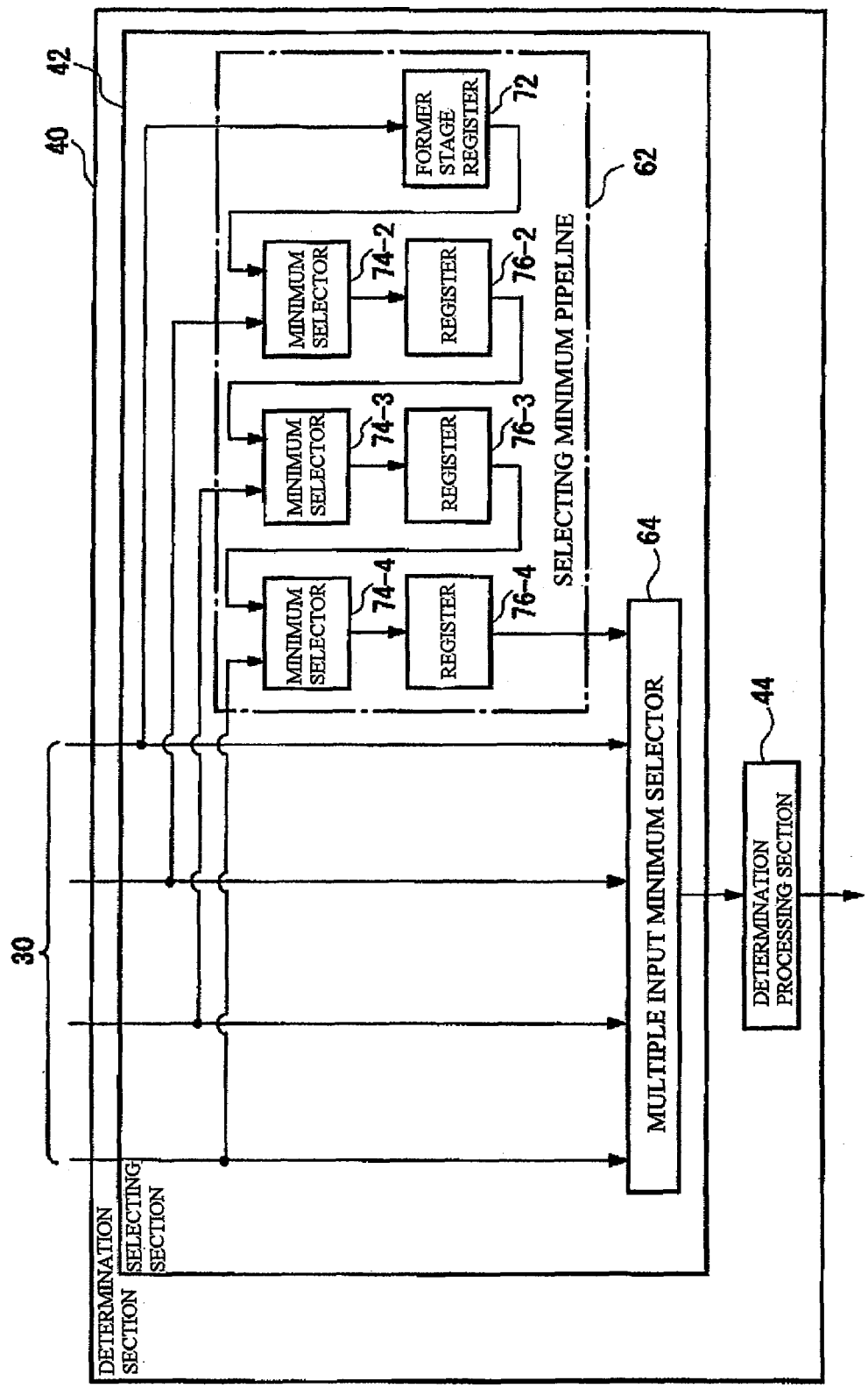

[Figure 12]
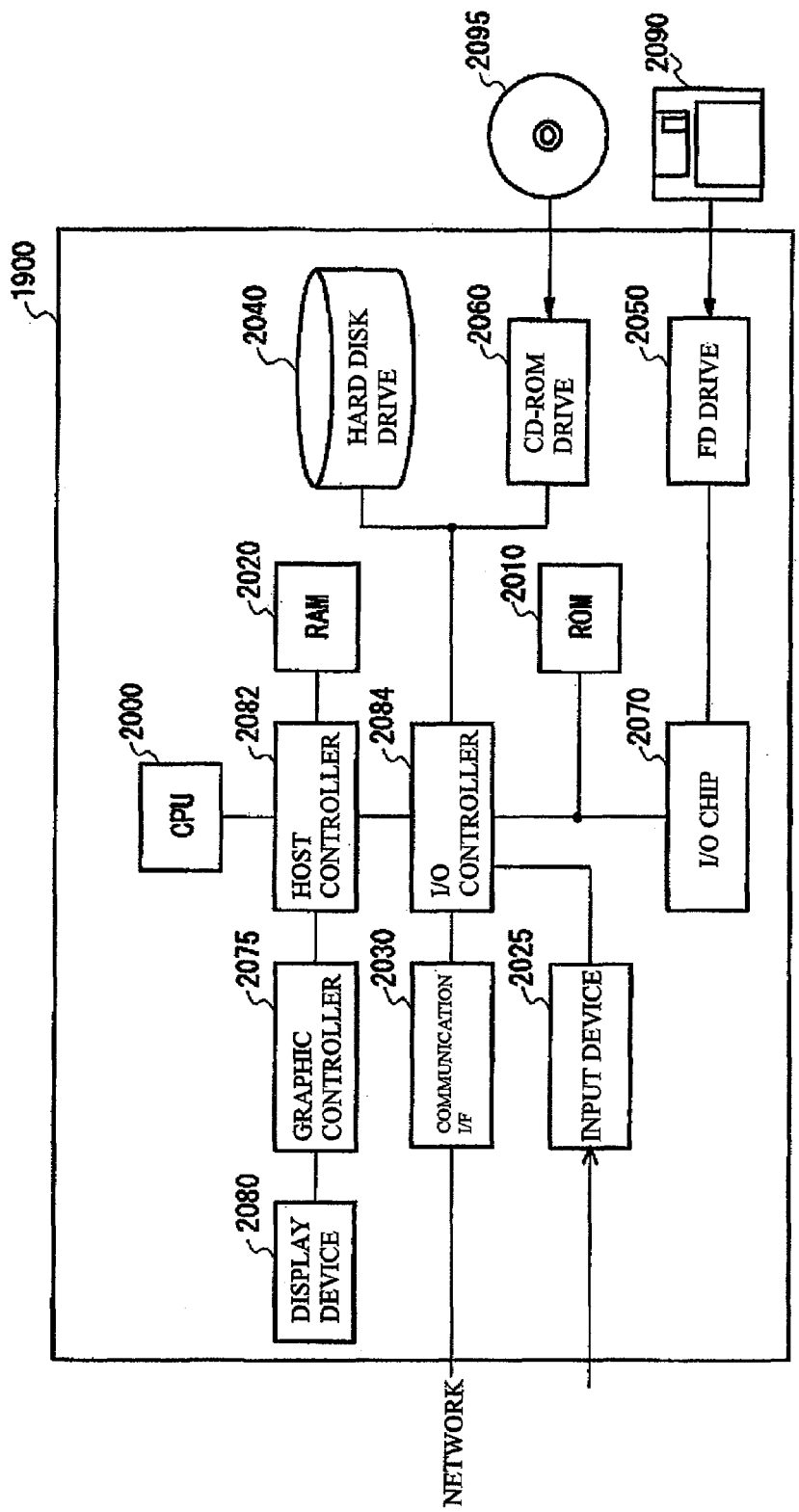

US 8,271,981 B2

DETECTING AN EXTRAORDINARY BEHAVIOR

BACKGROUND OF THE INVENTION

1. Technical Field

The present invention relates to a detecting apparatus, a program and a detecting method for detecting whether an extraordinary behavior is performed when a monitoring task is executed on an information processing apparatus.

2. Description of the Related Art

As functions and circuits to be incorporated in a VLSI chip or the like are increasing, a time required for performing validation, debug and the like on hardware and software are also increasing. It can be considered to perform detection on an executing section (abnormal point) that is for executing an operation different from a usual (normal) one, and performing validation, debug and the like on an operation of an information processing apparatus focusing on the detected abnormal point. That enables validation and debug selectively on an extraordinary behavior. Accordingly, a total time spent on the validation, debug and the like can be shortened.

Japanese published unexamined Patent Application No. 4-68471 describes a system for storing an operating task name with a certain time interval and estimating a share of each task in an execution time based on binomial distribution. Japanese published unexamined Patent Application No. 3-210643 describes a system for measuring an execution time for each task in a computation system in which a plurality of tasks are executed in parallel. More specifically, Application No. 3-210643 describes a system for providing an execution time totalizing (or accumulating) region for each task, adding a processing time of the task to the execution time totalizing region after the task has been executed, and if a lower order task interrupted the task, subtracting the processing time of the lower order task from the execution time totalizing region.

SUMMARY OF THE INVENTION

In a first embodiment of the present invention, a detecting apparatus for detecting whether an extraordinary behavior is performed when a monitoring task (or target task to be monitored) is executed on an information processing apparatus or not, comprising: an obtaining section for obtaining a measurement data including an executing timing and an execution time for each occasion of execution when the monitoring task is executed for a number of times on the information processing apparatus; a distance calculating section for calculating a distance between a measured point corresponding to each measurement data in a multi-dimensional space on which an executing timing and an execution time are allocated to different coordinates and another measured point placed in a predetermined range; and a determining section for determining whether the extraordinary behavior is performed when the monitoring task corresponding to the measurement data is executed or not based on the distance obtained for the measured point corresponding to the measurement data is provided.

In a second embodiment of the present invention, a program for causing an information processing apparatus or another information processing apparatus to function as a detecting apparatus for detecting whether an extraordinary behavior is performed when the monitoring task is executed on the information processing apparatus or not, wherein the program causes the information processing apparatus or another information processing apparatus to function as an obtaining section for obtaining a measurement data including an executing timing and an execution time for each occasion of execution when the monitoring task is executed for a number of times on the information processing apparatus from an input device; a distance calculating section for calculating a distance between a measured point corresponding to each measurement data in a multi-dimensional space on which the executing timing and the execution time are allocated to different coordinates and another measured point placed in a predetermined range by a CPU; and a determining section for determining by a CPU whether an extraordinary behavior is performed when the monitoring task corresponding to the measurement data is executed or not based on the distance obtained for the measured point corresponding to the measurement data and a detecting method executed when the program is executed on the information processing apparatus are provided.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1 shows a configuration of a detecting device 10 according to the embodiment of the present invention with an information processing apparatus 100;

FIG. 2 shows an example of an executing timing and an execution time (processing time or actual execution time) of a task;

FIG. 3 shows an example of a configuration of the determining section 40 according to the embodiment of the present invention with the distance calculating section 30;

FIG. 4 shows an example of distances between the measured point Pi and the four measured points Pi−4 to Pi+4 before and after the measured point Pi on the two dimensional space on which the executing timing is allocated to the X axis and the execution time is allocated to the Y axis;

FIG. 5 shows an example of a plurality of measured points corresponding to a plurality of measurement data obtained when the monitoring task 110 that is plotted on the two-dimensional space, on which the executing timing is allocated to the X axis and the execution time is allocated to the Y axis, is executed for a number of times;

FIG. 6 shows another example of a plurality of measured points corresponding to a plurality of measurement data when the monitoring task 110 that is plotted on the two-dimensional space, on which the executing timing is allocated to the X axis and the execution time is allocated to the Y axis, is executed for a number of times;

FIG. 7 shows an example of a constant k for compensating the execution time or the executing timing in the calculation formula of distance;

FIG. 8 shows distances that can be reused among the previously calculated distances in calculating a distance between the measured point Pi and four measured points Pi−4 to Pi−1 before the measured point Pi;

FIG. 9 shows distances that can be reused among the previously calculated distances;

FIG. 10 shows an example of a configuration of the distance calculating section 30 according to the embodiment of the present invention;

FIG. 11 shows an example of a configuration of the determining section 40 according to the embodiment of the present invention; and FIG. 12 shows an example of a hardware configuration of the computer 1900 according to the embodiment of the present invention.

DETAILED DESCRIPTION

The present invention will be described below by using embodiments of the present invention, though; the embodiments below do not limit the present invention described in the claims. Nor, all the combinations of the characteristics described in the embodiments are needed in the solution of the present invention.

FIG. 1 shows a configuration of a detecting device 10 according to one embodiment with an information processing apparatus 100. FIG. 2 shows an example of an executing timing and an execution time (processing time or actual execution time) of a task.

A detecting device 10 detects whether an extraordinary behavior is performed when the monitoring task 110 is executed on the information processing apparatus 100. The detecting device 10 previously decides a monitoring task 110 among a plurality of kinds of tasks executed by the information processing device 100 and detects whether an extraordinary behavior is performed or not when the monitoring task 110 is executed.

The task refers to processing executed in a processor unit of the information processing apparatus 100. The task includes a function, a process, a thread and the like. An extraordinary behavior of a task refers to an operation different from a normal (usual) operation when the task is executed for a number of times by the information processing apparatus 100, for example. If a program, hardware or the like that called the task or the task itself may have an abnormality, the task performs an extraordinary behavior (operates abnormally). The extraordinary behavior is not necessarily a failure or a malfunction, but may be a failure or a malfunction with high possibility.

The detecting device 10 includes an obtaining section 20, a distance calculating section 30 and a determining section 40. The obtaining section 20 obtains a measurement data including an executing timing and an execution time for each occasion of execution when the monitoring task 110 is executed for a number of times on the information processing apparatus 100.

The executing timing of the task can be an activating timing (startup timing) of the task (for example an activating time), a finishing timing of the task (for example a finishing time), an executing order of the task (first, second, . . . ), for example, as shown in FIG. 2. The executing time of the task may be the actual execution time or the processing time of the task. The actual execution time of the task is an actual time in which the task has been executed by the information processing apparatus without including a waiting time (quiescent period) in which it is interrupted by another task. The processing time of the task is a time period starting at the activating timing of the task up to its finishing timing, including the waiting time, in which the task is interrupted by another task.

The obtaining section 20, for example, may obtain the measurement data in real time from the information processing apparatus 100 while the information processing apparatus 100 is operating, or may obtain the measurement data from the log, which includes the activating time of the execution, the finishing time of the execution and the like for the task executed by the information processing apparatus 100, after the operation of the information processing apparatus 100 finished. For example, the obtaining section 20 may obtain the measurement data from the information processing apparatus 100 via a hardware interface. As another example, the obtaining section 20 may obtain the measurement data that is measured after the monitoring task 110 is executed via a software interface, if only the detecting device 10 is implemented on the information processing apparatus 100 as the monitoring task 110 is, as the program is executed on the information processing apparatus 100.

The obtaining section 20 preferably obtains the measurement data on all occasions of executing the monitoring task 110 by the information processing apparatus 100 during the measuring period. Essentially, the obtaining section 20 may obtain the measurement data on a part of all occasions of executing the monitoring task 110 during the measuring period, such as to obtain the measurement data for every certain period of time.

For example, a task scheduler for the monitoring task 110 or the information processing apparatus 100 may write a flag, a task ID and the like in a register that can be monitored by the obtaining section 20 at the activating timing of the monitoring task and may delete the flag or the task ID from the register at the finishing timing of the monitoring task 110 for example. Then, the obtaining section 20 may detect the executing timing and the execution time for the monitoring task by reading out the register at every certain timing, and obtain the measurement data. The obtaining section 20 may regularly issue a command to the information processing apparatus 100 to call the state of task execution by the information processing apparatus 100 and obtain the measurement data based on the response to the command, for example.

The distance calculating section 30 calculates a distance between a measured point corresponding to each measurement data in the multi-dimensional space on which an executing timing and an execution time are allocated to different coordinates and another measured point placed in a predetermined range. The distance calculating section 30 may allocate the executing timing and the execution time to the X axis and the Y axis on a two-dimensional space, for example. Further, the distance calculating section 30 may allocate a parameter other than the executing timing and the execution time to the other coordinates and calculate a distance in a three or more dimensional space.

The distance calculating section 30 may calculate a distance from b measured points before the measured point concerned (b is a natural number of 1 or more) and f another measured points after the measured point concerned (f is a natural number of 1 or more), for example, as a distance from another measured point placed in a predetermined range. Alternatively, the distance calculating section 30 may calculate a distance from b another measured points before the measured point concerned, or a distance from f another measured points after the measured point concerned, instead. The distance calculating section 30 may calculate a distance from another measured point dynamically selected according to predetermined conditions, for example.

The determining section 40 determines whether an extraordinary behavior is performed or not when the monitoring task 110 corresponding to the measurement data is executed based on the distance obtained for the measured point corresponding to the measurement data. The determining section 40 may determine whether an extraordinary behavior is performed or not when the monitoring task 110 corresponding to the measurement data is executed based on the result of comparison between a distance obtained for a measured point corresponding to the measurement data and a distance obtained for a measured point corresponding to another measurement data, as an example.

The determining section 40 may determine whether an extraordinary behavior is performed or not based on a distance between measured points on the two-dimensional space on which the executing timing and the execution time are allocated to the X axis and the Y axis. Alternatively, the determining section 40 may determine whether an extraordinary behavior is performed or not based on a distance between measured points in a three or more dimensional space to which a parameter other than the executing timing and the execution time is allocated, for example. Alternatively, the determining section 40 may determine whether an extraordinary behavior is performed or not when the monitoring task 110 corresponding to the measurement data is executed based on the other parameter, the conditions and the like in addition to a distance obtained for the measured point corresponding to the measurement data.

The determining section 40 may determine that an extraordinary behavior is performed when the monitoring task 110 corresponding to the measurement data is executed in response to the fact that the distance obtained for the measured point corresponding to the measurement data exceeds a predetermined threshold. In such a case, the determining section 40 may identify a task by a program file, a routine name and the like to be executed and use a different threshold for each of the identified task, for example. The determining section 40 may also have a threshold storing section for storing a threshold in association with a task.

According to the detecting device 10, the monitoring task 110 performed an extraordinary behavior can be accurately detected with a simple configuration. Accordingly, according to the detecting device 10, an execution section (or portion) that may include a failure with a high possibility can be identified so that a time required for validation, debug and the like can be shortened.

FIG. 3 shows an example of the distance calculating section 30 and the determining section 40 according to the embodiment. The distance calculating section 30 may calculate a distance between the measured point corresponding to each of the measurement data and the other measured points before and after by a predetermined number, for example. In such a case, the determining section 40 may have a selecting section 42 and a determination processing section 44.

The selecting section 42 selects a minimum distance among distances between a measured point corresponding to the measurement data and the other measured points before and after by a predetermined number (for example, by the number of b for before and by the number of f for after). The determination processing section 44 determines whether an extraordinary behavior is performed or not when the monitoring task 110 corresponding to the measurement data is executed based on the result of comparison between the minimum distance selected for the measured point corresponding to the measurement data and the minimum distance obtained for the measured point corresponding to the other measurement data. The determination processing section 44 may determine that an extraordinary behavior is performed when the monitoring task 110 corresponding to the measurement data is executed, when a resulted value of the minimum distance selected in correspondence with the measurement data divided by the minimum distance selected in correspondence with the measurement data immediately before goes outside a predetermined reference range, for example.

FIG. 4 shows an example of distances between the measured point Pi and the four measured points Pi−4 to Pi+4 before and after the measured point Pi on the two dimensional space on which the executing timing is allocated to the X axis and the execution time is allocated to the Y axis. The distance calculating section 30 inputs p1, p2, . . . , pi−1, pi, pi+1, . . . , pn−1, pn in order from the obtaining section 20 as a series of measured points corresponding to measurement data. Here, n is the number of times for the monitoring task 110 being activated during the measurement period, i is a positive integer less than n. The distances Di, j between a measured point pi and a measured point pj, which are the points of the executing timing and the execution time allocated to the X axis and the Y axis on the two dimensional space, are expressed by the formula (1) below.

$$D_{i,j} = \sqrt{(pi(x)-pj(x))^2 + (Kpi(y)-Kpj(y))^2} \quad (1)$$

In the formula (1), pi (x) represents a value on the x coordinate (for example, the executing timing at the measured point Pi) and pi (y) represents a value on the y coordinate (for example, the execution time at the measured point Pj). Pj (x) represents a value of pj on the X coordinate (for example, the executing timing at the measured point pj) and pj (y) represents a value of pj on the Y coordinate (for example, the execution time at the measured point pj). K refers to a ratio for compensating a difference in unit between the executing timing and the execution time. That is, the distance calculating section 30 may calculate a root of additional value of the second power of a difference in the executing timing and the second power of a value multiplying a difference in the execution time by the factor k as a distance.

The distance calculating section 30 calculates a distance between b measured points pi−b to pi−1 chronologically before the measured point pi and f measured points pi+1 to pi+f chronologically after the measured point pi by calculation represented by the formula (1). Accordingly, the distance calculating section 30 can output (b+f) distances represented by the formula (2) below. The distance calculating section 30 may more accurately determine whether an extraordinary behavior is performed or not as b and f are increased. If b and f decreased, the amount of data to be accumulated can be decreased and the calculation amount can be decreased.

$$D_{i,i-b}, D_{i,i-b+1}, \ldots, D_{i,i-2}, D_{i,i-1}, D_{i,i+1},$$

$$D_{i,i+2}, \ldots, D_{i,i+f-1}, D_{i,i+f} \quad (2)$$

The selecting section 42 inputs (b+f) distances represented by the formula (2) for a measurement data. Then, the selecting section 42 selects the minimum distance $D^{min}_i$ for a measurement data as represented by the formula (3) below from the (b+f) distances for the measured point pi.

$$D_i^{min} = \min(D_{i,i-b}, D_{i,i-b+1}, \ldots, D_{i,i-2}, D_{i,i-1}, D_{i,i+1},$$
$$D_{i,i+2}, \ldots, D_{i,i+f-1}, D_{i,i+f}) \quad (3)$$

The selecting section 42 selects the minimum distance as mentioned above, for each of the measured points p1 to pn corresponding to a plurality of measurement data. Then, the selecting section 42 outputs . . . $D^{min}_{i-3}$, $D^{min}_{i-2}$, $D^{min}_{i-1}$, $D^{min}_i$, $D^{min}_{i+1}$, $D^{min}_{i+2}$, . . . to the determination processing section 44 in order as a series of the minimum distances for the measurement data.

The determination processing section 44 calculates a divided value ($D^{min}_i/D^{min}_{i-1}$) of the selected minimum distance $D^{min}_i$ divided by the minimum distance $D^{min}_{i-1}$ that is selected in correspondence with the measurement data immediately before for each of the plurality of measurement data. Then, the determination processing section 44 determines that an extraordinary behavior is performed when the monitoring task 110 is executed on the measurement data, if the divided value ($D^{min}_i/D^{min}_{i-1}$) is bigger than a predetermined upper limit $T_U$ as shown in the formula (4) below, or if the divided value ($D^{min}_i/D^{min}_{i-1}$) is less than a predetermined lower limit $T_L$ as shown in the formula (5) below.

$$\frac{D^{min}_i}{D^{min}_{i-1}} > T_U \quad (4)$$

$$\frac{D^{min}_i}{D^{min}_{i-1}} < T_L \quad (5)$$

That is, the determination processing section 44 determines that an extraordinary behavior is performed when the monitoring task 110 corresponding to the measurement data is executed in response to the fact that the divided value goes outside a predetermined reference range. In such a case, the determining processing section 44 may identify a task by a program file and a routine name and the like to execute the task, for example, and use different upper limit value $T_U$ and the lower limit value $T_L$ for each of the identified tasks. The determination processing section 44 may include a threshold storing section for storing a threshold in association with a task.

According to the obtaining section 20 and the distance calculating section 30 described above, it may be determined that an extraordinary behavior is performed on the execution section in which a distance from the measured point corresponding to the measurement data immediately before suddenly becomes long or the execution section in which the distance suddenly becomes short. That is, according to the obtaining section 20 or the distance calculating section 30, it may be determined that an extraordinary behavior is performed on the execution section in which the executing timing of the monitoring task 110 suddenly becomes long or the execution section in which executing timing suddenly becomes short, or on the execution section in which execution time of the monitoring task 110 suddenly becomes long or the execution section in which execution time suddenly becomes short.

FIG. 5 shows an example of a plurality of measured points corresponding to a plurality of measurement data obtained that are plotted on the two-dimensional space, on which the executing timing is allocated to the X axis and the execution time is allocated to the Y axis, when the monitoring task 110 is executed for a number of times. If the execution times of the monitoring task 110 concentrate near a value (usual value) in a usual operating time (in FIG. 5, they concentrate near 100), the measured point Px corresponding to the measurement data when the monitoring task 110 performs an extraordinary behavior has the execution time of a value extremely longer or extremely shorter than the usual value, for example. According to the detecting device 10, the measured point Px in such a case can be detected as the case where an extraordinary behavior is performed in the monitoring task 110.

FIG. 6 shows another example of a plurality of measured points corresponding to a plurality of measurement data that are plotted on the two-dimensional space, on which the executing timing is allocated to the X axis and the execution time is allocated to the Y axis, when the monitoring task 110 is executed for a number of times. When the processing includes the branching conditions (for example, IF-THEN-ELSE processing) or the loop processing by which the number of loops changes according to the conditions, the monitoring task 110 has a different execution time according to the set conditions. In such a case, the execution times of the monitoring task 110 in the usual operation concentrate on a plurality of usual values respectively (for example, in FIG. 6, they concentrate near 40, 80, 150). The measured point Px corresponding to the measurement data in the case where the monitoring task 110 performs an extraordinary behavior becomes a value different from all the plurality of usual values (for example, a value between usual values). According to the detecting device 10, a section whose minimum distance from the close measured point suddenly changes is detected. Therefore, the measured point Px in the case of FIG. 6 in addition to the case of FIG. 5 can be detected as a case where an extraordinary behavior is performed in the monitoring task 110.

FIG. 7 shows an example of a ratio k for compensating the execution time or the executing timing in the calculation of distance represented by the formula (1). In the formula (1), the ratio k compensates a difference of a unit between the executing timing and the execution time. The ratio k may be also multiplied by the executing timing or by the execution time. As the bigger ratio k is multiplied, the parameter multiplied by the ratio k (i.e., the execution time or the executing timing) has a bigger rate to contribute to the distance.

The distance calculating section 30 may decide a ratio k for reflecting the execution time to the distance (or a ratio k for reflecting the executing timing to the distance) based on an average execution interval and an average execution time of the monitoring task 110, for example. The distance calculating section 30 may decide a ratio k with which the average execution interval and the average execution time almost match, for example. The distance calculating section 30 may use a value of a difference of the executing timings of two measured points and a value of a difference of the execution time multiplied by a ratio in calculating a distance between two measured points. Alternatively, distance calculating section 30 may use a value of a difference between a value of a difference of the executing timings of two measured points multiplied by a ratio and a value of a difference of the execution times of two measured points in calculating a distance between two measured points. As a result, according to the distance calculating section 30, a distance that averagely reflects the executing timing and the execution time can be calculated.

FIG. 8 shows distances that can be reused among the calculated distances in calculating a distance between the measured point Pi and four measured points $P_{i-4}$ to $P_{i-1}$ before the measured point Pi. FIG. 9 shows distances that can be reused among the previously calculated distances.

The distance calculating section 30 calculates distances between the measured point pi and a plurality of measured points before the measured point pi, and distances between the measured point pi and a plurality of distances after the measured point pi. Here, the distance Di,j from the measured point pi to the other measured point pj is equal to the distance Dj, i from the other measured point pi to the measured point pi. Accordingly, the distance calculating section 30 can reuse a distance that is calculated in calculation of distances for respective measured points pi–1 to pi–b when it calculates a distance between the measured point pi and b measured points pi–1 to pi–b before the measured point pi.

That is, the distance calculating section 30 may calculate a distance between the first measured point corresponding to the first measurement data and the second measured point after the first measured point, and reuse a distance from the second measured point that is previously calculated for the first measured point as a distance from the first measured point that comes before the second measured point for the second measured point corresponding to the second measurement data. As a result, according to the distance calculating section 30, the calculation amount can be reduced at the distance calculation.

For example, when the distance calculating section 30 calculates the distances between the measured point Pi and four measured points before and after the measured point Pi, it may reuse the distance Di-4, i that is calculated at the distance calculation at the $(i-4)^{th}$ measured point, the distance Di-3, i that is calculated at the distance calculation at the $(i-3)^{th}$ measured point, the distance Di-2, i that is calculated at the $(i-2)^{th}$ measured point, and the distance Di-1, i that is calculated at the $(i-1)^{th}$ measured point, as shown in FIG. 8.

If the distance calculating section 30 has a distance that can be reused among the previously calculated distances, it may temporally store the distance and delete a distance that is not to be reused. For example, when the distance calculating section 30 calculates distances between the measured point Pi and four measured points before and after the measured point Pi, it only needs to store at least $\{b(b+1)/2\}=10$ distances as shown in FIG. 9.

FIG. 10 shows an example of a configuration of the distance calculating section 30 according to the embodiment. The distance calculating section 30 may have a register pipeline 52 and a plurality of distance calculators 54 for example. The register pipeline 52 includes a plurality of cascaded registers 56 with a measurement data obtained by the obtaining section 20 being stored in the first stage registers 56 for each cycle and the measurement data propagated in each register stored in the next stage registers 56 for each cycle. That is, the register pipeline 52 includes a plurality of cascaded registers 56, and propagates the obtained measurement data sequentially input into the first stage to the latter stage registers 56 for each cycle. When distances from four measured points before and after the measured point Pi are calculated, the register pipeline 52 may include cascaded five registers 56-1 to 56-5, for example.

A plurality of distance calculators 54 are provided in correspondence with a plurality of registers 56 other than the last stage of register 56 for calculating a distance between the measured point corresponding to the measurement data stored in a corresponding register 56 and the measured point corresponding to the measurement data stored in the last stage of the register 56. That is, the plurality of distance calculators 54 calculates each of the distances between the measured point corresponding to measurement data stored in the last stage register 56 of the register pipeline 52 and the measured point corresponding to each of the following measurement data stored in each of the registers 56 other than those at the last stage for every cycle. For example, when the distance calculating section 30 calculates a distance from four measured points before and after the measured point Pi, the distance calculating section 30 may have four distance calculators 54-1 to 54-4, as an example.

Each of the plurality of distance calculators 54 may calculate a distance represented by the abovementioned formula (1) as an example. Alternatively, each of the plurality of distance calculators 54 may calculate a distance by the formula (6) to be described below instead. That is, the distance calculating section 30 may calculate an additional value of the second power of a difference in the executing timing and the second power of a value of a difference in the execution time multiplied by a factor k as a distance. By performing the calculation represented in the formula (6), the distance calculator 54 needs not to perform square root calculation unlike the calculation of the formula (1). That simplifies the hardware configuration.

$$D_{i,j}=(pi(x)-pj(x))^2+(Kpi(y)-Kpj(y))^2 \quad (6)$$

FIG. 11 shows an example of a configuration of the determining section 40 according to the embodiment. The determining section 40 of the configuration shown in FIG. 11 is input the distance calculated by the distance calculating section 30 shown in FIG. 10. The selecting section 42 in the determining section 40 includes the selecting minimum pipeline 62 and the multiple input minimum selectors 64.

The selecting minimum pipeline 62 includes a former stage register 72, a plurality of minimum selectors 74, and a plurality of registers for selectors 76. The former stage register 72 is provided in correspondence with the distance calculator 54 that corresponds to the first stage registers 56 in the register pipeline 52. The former register 72 delays a distance that is output from the first stage distance calculator 54 by one cycle. The plurality of registers 76 for selectors are provided in correspondence with a plurality of minimum selectors 74. The plurality of registers 76 for selectors delay a distance that is output from the corresponding minimum selector 74 by one cycle.

The plurality of minimum selectors 74 are provided in correspondence with the distance calculators 54 corresponding to the register 56 other than those at the first stage among a plurality of distance calculators 54 in the register pipeline 52. The minimum selector 74 corresponding to the second stage register 56 outputs a value that is a distance output from the first stage distance calculator 54 delayed by one cycle and the shorter distance among the distances output from the second stage distance calculator 54. The plurality of minimum selectors 74 corresponding to the registers of the third stage or later 56 output a value that is a distance output from the minimum selector 74 corresponding to the former stage register 56 delayed by one cycle and the shorter distance among the distances output by the corresponding distance calculator 54. For example, when a distance from four measured points before and after the measured point Pi is calculated, the selecting minimum pipeline 62 may include three minimum selectors 74-1 to 74-3 and three registers 76-1 to 76-3 for selectors, for example.

Such a selecting minimum pipeline 62 inputs a distance between the measured point corresponding to the measurement data and the measured point corresponding to the preceding measurement data, which is output from the distance calculator 54 corresponding to the register 56 that stores the measurement data, in order each time when the measurement data input in the first stage register pipeline 52 is propagated by the register pipeline 52, to the minimum selector 74 at each stage. Then, the selecting minimum pipeline 62 outputs the minimum distance between the measured point corresponding to the measurement data and the measured point corresponding to the preceding measurement data from the last stage minimum selector 74 by outputting the distance shorter than the distance input from the former stage minimum selector 74 at the minimum selector 74 of each stage in order.

In short, the selecting minimum pipeline 62 inputs each distance between the measured point corresponding to the measurement data and each measured point corresponding to each preceding measurement data, which is output from the distance calculator 54 corresponding to the register 56 that stores the measurement data for each cycle in order each time when the measurement data input in the first stage register pipeline 52 is propagated by the register pipeline 52, to the first input of the minimum selector 74 at each stage. Further, the selecting minimum pipeline 62 inputs the output from the former stage minimum selector 74 to the second input of the minimum selector 74 at each stage by delaying the output by one cycle. Yet further, the selecting minimum pipeline 62 inputs the output from the first stage distance calculator 54 to the second input of the first stage minimum selector 74 by delaying the output by one cycle. Then, the selecting minimum pipeline 62 outputs the minimum distance among distance between the measured point corresponding to each measurement data and each measured point corresponding to each preceding measurement data from the minimum selector 74 by the pipeline processing.

The multiple input minimum selectors 64 selects the minimum distance from among the values of respective distances output from a plurality of distance calculators 54 and the distance output from the last stage minimum selector 74 delayed by one cycle. That is, the multiple input minimum selectors 64 outputs the minimum value among distances between the measured point corresponding to the last stage measurement data and the measured point corresponding to each measurement data following to the measurement data which are output by the plurality of distance calculators 54, and distances between the measured point corresponding to the last stage measurement data and the measured point corresponding to each preceding measurement data, which are output by the selecting minimum pipeline 62.

According to the distance calculating section 30 and the determining section 40 of the abovementioned configuration, a distance between the measured point and the other measured point can be calculated in real time for each measured point corresponding to the measurement data using hardware. As the distance calculating section 30 and the determining section 40 reuses the previously calculated distance, their configurations are simplified. As the distance calculating section 30 and the determining section 40 selects only the minimum value among the reused distances calculated by the minimum selector 74 and stores it, their storage capacity can be small.

FIG. 12 shows an example of a hardware configuration of the computer 1900 according to the embodiment of the present invention. The computer 1900 according to the embodiment includes a CPU 2000, which is a command processing device, and a CPU peripheral section including a RAM 2020, a graphic controller 2075, and a display device 2080 connected with each other by a host controller 2082, an input/output section including an input device 2025, a communication interface 2030, a hard disk drive 2040 and a CD-ROM drive 2060, which are connected to the host controller 2082 by an input/output controller 2084, and a legacy section including a ROM 2010, a flexible disk drive 2050, and an input/output chip 2070, which are connected to the input/output controller 2084.

The host controller 2082 connects the RAM 2020, with the CPU 2000 and the graphic controller 2075 which access the RAM 2020 in a high transfer rate. The CPU 2000 operates based on a program stored in the ROM 2010 and the RAM 2020 for controlling over respective sections. The graphic controller 2075 obtains an image data that is generated on a frame buffer provided in the RAM 2020 by the CPU 2000 or the like, and makes the image data on the display device 2080. The graphic controller 2075 may include the frame buffer for storing the image data that is generated by the CPU 2000 or the like, instead.

The input/output controller 2084 connects the host controller 2082, with the input device 2025 for inputting information from the other devices, the communication interface 2030 which is a relatively high rate input/output device, the hard disk drive 2040, and the CD-ROM drive 2060. The communication interface 2030 communicates with the other device via a network. The hard disk drive 2040 stores a program and data used by the CPU 2000 in the computer 1900. The CD-ROM drive 2060 reads the program or the data from the CD-ROM 2095 and provides it to the hard disk drive 2040 via the RAM 2020.

To the input/output controller 2084, the ROM 2010 and a relatively slow rate input/output device such as the flexible disk drive 2050 and the input/output chip 2070 are connected. The ROM 2010 stores a boot program executed when the computer 1900 is activated, a program depending on hardware of the computer 1900 and the like. The flexible disk drive 2050 reads a program or data from the flexible disk 2090 and provides it for the hard disk drive 2040 via the RAM 2020. The input/output chip 2070 connects various input/output devices via the flexible disk drive 2050, or a parallel port, a serial port, a keyboard port, a mouse port and the like.

The program provided for the hard disk drive 2040 via the RAM 2020 is stored on a storage medium such as a flexible disk 2090, a CD-ROM 2095, an IC card or the like, and is provided by a user. The program is read from the recording medium installed to the hard disk drive 2040 in the computer 1900 via the RAM 2020 and executed by the CPU 2000.

The program installed to the computer 1900 for causing the computer 1900 to function as the detecting device 10 includes an obtaining module, a distance calculating module, and a determining module. The program causing the computer 1900 to function as the detecting device 10 may be executed by an information processing apparatus (computer 1900) for executing the monitoring task 110 different from the monitoring task 110, or may be executed by the information processing apparatus 100 (computer 1900) itself that executes the monitoring task 110. The program or the modules works the CPU 2000 or the like to cause the computer 1900 to function as the obtaining section 20, the distance calculating section 30, and the determining section 40, respectively. More specifically, the program or the modules causes the information processing apparatus or the other information processing apparatus to function as the obtaining section 20 for obtaining the measurement data by the input device 2025, a distance calculating section 30 for calculating a distance from the other measured point placed in a predetermined range by the CPU 2000, and the determining section 40 for determining whether an extraordinary behavior is performed when the monitoring task 110 is executed by the CPU 2000.

The program or the module mentioned above may be stored in an external storage medium. As the storage medium, the flexible disk 2090, the CD-ROM 2095, as well as an optical storage medium such as the DVD or the CD, a magneto-optical storage medium such as an MO and the like, a tape medium, a semiconductor memory such as an IC card and the like can be used. The program may be provided for the computer 1900 via a network by using a storage device such as a hard disk, a RAM or the like provided for a server system connected with a dedicated communication network or the Internet as a storage medium.

The present invention has been described by taking embodiments, the technical range of the present invention is not limited to the range described in the above mentioned embodiments. It is apparent to those skilled in the art that various modifications and improvements can be added to the abovementioned embodiments. It is apparent from the description of the claims that embodiments with such modifications and improvements are also included in the technical range of the present invention.

What is claimed is:

1. A detecting apparatus for detecting an extraordinary behavior performed when a monitoring task is executed on an information processing apparatus, the detecting apparatus comprising:
   a computer processor; and
   a computer readable tangible storage device coupled to the processor and comprising computer code executable by the computer processor to cause the computer processor to:
      obtain measurement data including an executing timing and an execution time for each occasion that a monitoring task is executed on an information processing apparatus, wherein each executing timing indicates a specific instance that the monitoring task is executed, and wherein each measurement data corresponds to one of a plurality of measured points;
      calculate a plurality of distances between a first measured point and a plurality of other measured points placed in a predetermined range of executing timings of the first measured point, wherein the plurality of distances comprises a distance between the first measured point and a second measured point;
      determine a ratio for reflecting said execution time to said distance based on an average execution interval and an average execution time of said monitoring task;
      calculate a distance between two measured points by a difference of the executing timings of said two measured points and a value of a difference of said execution time multiplied by said ratio; and
      determine an extraordinary behavior is performed at the second measured point based on a comparison of the distance between the first measured point and the second measured point, and said plurality of distances, wherein the extraordinary behavior indicates that the distance between the first measured point and the second measured point exceeding a predetermined threshold.

2. The detecting apparatus according to claim 1, wherein the computer code is further executable by the computer processor to cause the processor to:
   select a minimum distance among the plurality of distances; and
   determine that the extraordinary behavior is performed at the first measured point based on a comparison between the minimum distance selected and the distance between the first measured point and the second measured point.

3. The detecting apparatus according to claim 2, wherein the computer code is further executable by the computer processor to cause the processor to:
   determine that the extraordinary behavior is performed when a calculated value of said distance for the first measured point divided by a distance for a measured point immediately preceding the first measured point is outside a predetermined reference range.

4. The detecting apparatus according to claim 3, wherein the computer code is further executable by the computer processor to cause the processor to:
   re-use said distance between the first measured point and the second measured point as said minimum distance for an immediately preceding measured point.

5. The detecting apparatus according to claim 4, wherein the computer code is further executable by the computer processor to:
   input, by a register pipeline including a plurality of cascaded registers, said obtained measurement data into a first stage of said register pipeline and propagate said obtained measurement data to latter stage registers in order for each cycle; and,
   calculate each of the distances between the measured point corresponding to measurement data stored in the last stage of said register pipeline and the measured point corresponding to each of the following measurement data stored in each of the plurality of cascading registers other than those at the last stage for each cycle; and
   input a distance between the measured point corresponding to the measurement data and the measured point corresponding to each preceding measurement data, which are output from a distance calculator corresponding to the register that stores the measurement data, each time that said measurement data input in said first stage register pipeline is propagated by said register pipeline, to the minimum selector at each stage, and outputs the minimum distance between (a) the measured point corresponding to the measurement data and (b) the measured point corresponding to the preceding measurement data from the last stage minimum selector, wherein the processor outputs the minimum distance by outputting the distance shorter than the distance input from the former stage minimum selector at the minimum selector of each stage in order; and
   output the minimum value among distances between the measured point corresponding to the last stage measurement data and the measured point corresponding to each measurement data following the measurement data which are output by a plurality of distance calculators, and minimum distance between the measured point corresponding to the last stage measurement data and the measured point corresponding to each preceding measurement data.

6. A method for detecting an extraordinary behavior performed when a monitoring task is executed on an information processing apparatus, the method comprising:
   obtaining measurement data including an executing timing and an execution time for each occasion that a monitoring task is executed on an information processing apparatus, wherein each executing timing indicates a specific instance that the monitoring task is executed, and wherein each measurement data corresponds to one of a plurality of measured points;
   calculating a plurality of distances between a first measured point and a plurality of other measured points placed in a predetermined range of executing timings of the first measured point, wherein the plurality of distances comprises a distance between the first measured point and a second measured point;
   determining a ratio for reflecting said execution time to said distance based on an average execution interval and an average execution time of said monitoring task;
   calculating a distance between two measured points by a difference of the executing timings of said two measured points and a value of a difference of said execution time multiplied by said ration; and
   determining an extraordinary behavior is performed at the second measured point based on a comparison of the distance between the first measured point and the second measured point, and said plurality of distances, wherein the extraordinary behavior indicates that the distance between the first measured point and the second measured point exceeding a predetermined threshold.

7. The method according to claim 6, further comprising:
   selecting a minimum distance among the plurality of distances; and determining that the extraordinary behavior is performed at the first measured point based on a comparison between the minimum distance selected and the distance between the first measured point and the second measured point.

8. The method according to claim 7, further comprising:
determining that the extraordinary behavior is performed when a calculated value of said distance for the first measured point divided by a distance for a measured point immediately preceding the first measured point is outside a predetermined reference range.

9. The method according to claim 8, further comprising:
re-using said distance between the first measured point and the second measured point as said minimum distance for an immediately preceding measured point.

10. A computer program product comprising:
a computer-readable tangible storage device encoded with a computer program having instructions executable by a processor to cause the processor to:
  obtain measurement data including an executing timing and an execution time for each occasion that a monitoring task is executed on an information processing apparatus, wherein each executing timing indicates a specific instance that the monitoring task is executed, and wherein each measurement data corresponds to one of a plurality of measured points;
  calculate a plurality of distances between a first measured point and a plurality of other measured points placed in a predetermined range of executing timings of the first measured point, wherein the plurality of distances comprises a distance between the first measured point and a second measured point;
  determine a ratio for reflecting said execution time to said distance based on an average execution interval and an average execution time of said monitoring task;
  calculate a distance between two measured points by a difference of the executing timings of said two measured points and a value of a difference of said execution time multiplied by said ratio;
  determine when an extraordinary behavior is performed at the second measured point based on a comparison of the distance between the first measured point and the second measured point, and said plurality of distances, wherein the extraordinary behavior indicates that the distance between the first measured point and the second measured point exceeding a predetermined threshold.

11. The computer program product as claimed in claim 10, wherein the instructions are further executable by a processor to cause the processor to:
select a minimum distance among the plurality of distances; and
determine that the extraordinary behavior is performed at the first measured point based on a comparison between the minimum distance selected and the distance between the first measured point and the second measured point.

12. The computer program product as claimed in claim 11, wherein the instructions are further executable by a processor to cause the processor to:
determine that the extraordinary behavior is performed when a calculated value of said distance for the first measured point divided by a distance for a measured point immediately preceding the first measured point is outside a predetermined reference range.

13. The computer program product as claimed in claim 12, wherein the instructions are further executable by a processor to cause the processor to:
re-use said distance between the first measured point and the second measured point as said minimum distance for an immediately preceding measured point.

* * * * *